United States Patent

[11] 3,619,003

| [72] | Inventor | Maurice E. Rich, Jr.<br>Memphis, Tenn. |
|------|----------|-------------------------------|
| [21] | Appl. No. | 6,248 |
| [22] | Filed | Jan. 27, 1970 |
| [45] | Patented | Nov. 9, 1971 |
| [73] | Assignee | Troxel Manufacturing Company<br>Moscow, Tenn. |

[54] REAR-MOUNTED BABY SEAT FOR A BICYCLE
6 Claims, 6 Drawing Figs.

| [52] | U.S. Cl. | 297/243, 297/DIG. 9 |
|------|----------|---------|
| [51] | Int. Cl. | A47c 15/00 |
| [50] | Field of Search | 297/243, DIG. 9 |

[56] References Cited
UNITED STATES PATENTS

| 1,353,108 | 9/1920 | Wood | 297/DIG. 9 |

FOREIGN PATENTS

| 594,731 | 11/1947 | Great Britain | 297/243 |

Primary Examiner—James C. Mitchell
Attorney—John R. Walker, III

ABSTRACT: A baby seat for mounting on the rear of a bicycle. The baby seat includes a horizontally extending lower frame assembly, an upper frame assembly attached to the lower frame assembly and defining an upwardly oriented interior adapted to receive the baby, and support braces for supporting the baby seat from the bicycle.

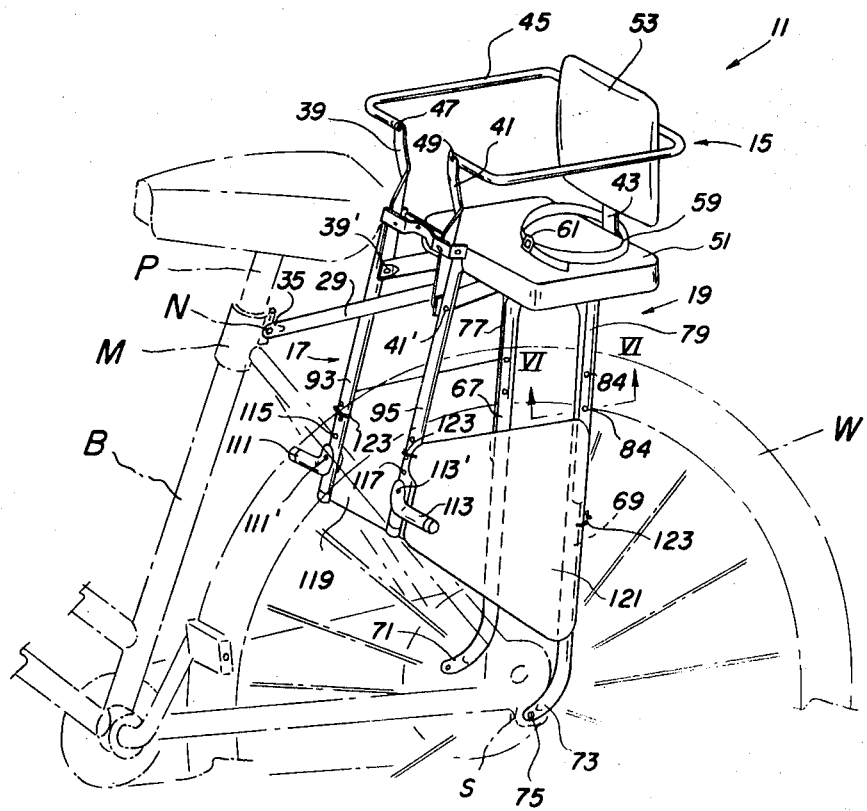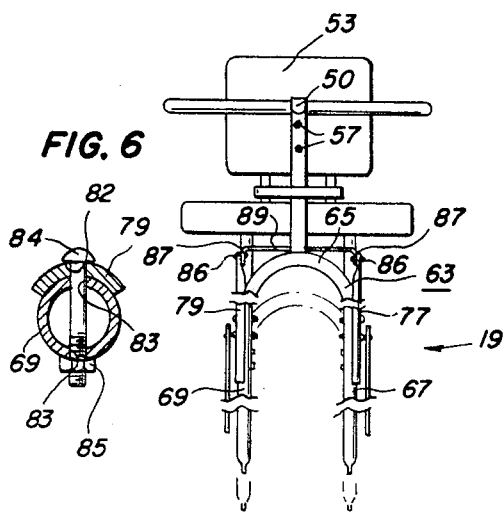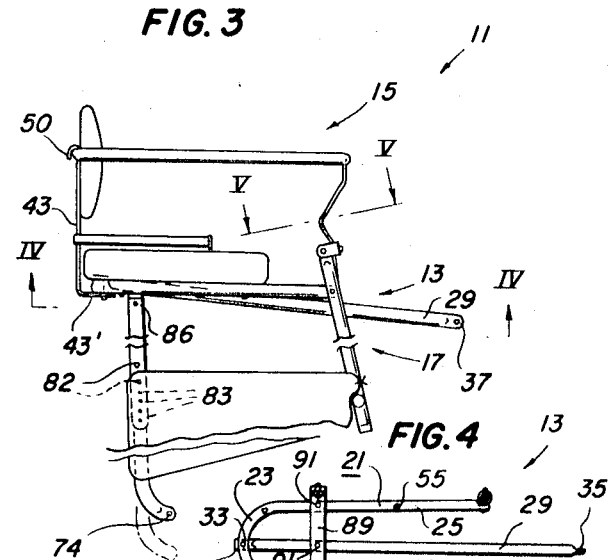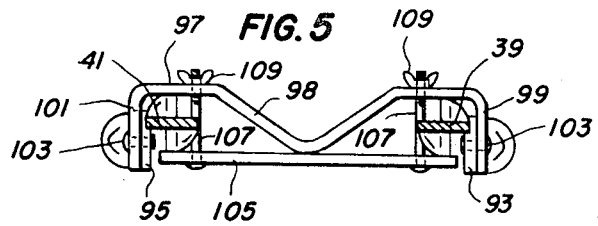

3,619,003

1
REAR-MOUNTED BABY SEAT FOR A BICYCLE

BACKGROUND OF THE INVENTION

1. Field of the Invention

The invention relates to baby seats adapted for use in riding a baby on the back of a bicycle.

2. Description of the Prior Art

In previous baby seats mounted on the back of a bicycle, there has been the problem of swaying of the baby seat from side to side relative to the bicycle as the bicycle was being ridden. It will be understood that if there is swaying of the baby seat relative to the bicycle, the supports in many cases would eventually become loose or break off and possible cause the baby to fall. This swaying has been caused by the difficulties and problems involved in mounting a baby seat on the rear of a bicycle. First of all, the places of mounting are limited. For example, the closest part of the bicycle to the baby seat is the fender directly below the baby seat, but the seat cannot be mounted there because of the unsturdiness thereof. The only places that are sturdy enough are on the frame or the rear axle of the bicycle and these places are spaced considerably from the baby seat so that by necessity the supports are long and therefore difficult to make sturdy.

Also, there has been the problem of adjustability of the height of the baby seat. Heretofore, the support braces were provided with a plurality of apertures adjacent the lower ends thereof and with a selected pair of the apertures being fitted over the axle or attached to structure adjacent the axle to adjust the height of the baby seat. However, many bicycles are fitted with speed-changing mechanisms in the area around and below the axle so that these speed-changing mechanism prevent adjustment to a lower height. In other words, the speed-changing mechanisms prevent the lower ends of the support braces from being moved downwardly to a lower adjustment of the baby seat.

SUMMARY OF THE INVENTION

The baby seat of the present invention is directed towards overcoming the heretofore mentioned and other problems relative to baby seats. Thus, the baby seat of the present invention provides a very sturdy baby seat in which there is no swaying of the baby seat from side to side relative to the bicycle. In addition, a baby seat is provided wherein the height thereof may be quickly and easily adjusted and without interference with the speed changing mechanism of the bicycle. Also, such a baby seat is provided which is safe and in which some of the screws may become loose and still the baby seat will not fall. Additionally, the baby seat of the present invention is simple to assemble. Another safety feature that is provided by the present invention is a lock bar means which holds the leg supports in place so that there is no chance of same collapsing with the baby.

The means by which the sturdiness function of the present invention is carried out in the present invention is the provision of an inverted U-shaped support brace which is adjustably attached a pair of bracket members which are arcuate in cross section to closely fit the legs support brace to give rigidity thereto. A central horizontally extending support bar is fixedly attached to the lower frame and extends forwardly to its place of attachment with the seat post mounting structure. The adjustability of the baby seat is no longer at the lower end of the support brace, as noted above, and the lower ends of the support brace extend forwardly, so that there is no longer any problem of interference with the speed-changing mechanism of the bicycle.

Another feature of the present invention is the utilization of a pair of spaced protector plates respectively attached to one of the reach members of the foot supports and to one of the legs of the support brace to prevent the baby's feet from contacting the spokes or wheels of the bicycle.

2
BRIEF DESCRIPTION OF THE DRAWING

FIG. 1 is a perspective view of the baby seat of the present invention shown mounted on a bicycle, with only a rear portion of the bicycle being shown and in broken lines.

FIG. 2 is a rear elevational view of the baby seat of the present invention.

FIG. 3 is a side elevational view thereof.

FIG. 4 is a sectional view as taken on the line IV—IV of FIG. 3, with certain parts being omitted for purposes of clarity.

FIG. 5 is an enlarged sectional view taken as on the line V—V of FIG. 3.

FIG. 6 is an enlarged sectional view taken as on the line VI—VI of FIG. 1.

DESCRIPTION OF THE PREFERRED EMBODIMENT

The baby seat 11 of the present invention includes in general a horizontally extending lower frame assembly 13, an upper frame assembly 15 attached to lower frame assembly 13 and defining an upwardly oriented interior adapted to receive a baby, a leg support assembly 17 attached to lower frame assembly 13 adjacent the forward end thereof, and a seat support assembly 19 supporting the baby seat from a bicycle, as bicycle B, shown in FIG. 1.

Lower frame assembly 13 includes a horizontally extending U-shaped member 21 having the bight 23 thereof adjacent the rearward end of baby seat 11 and the legs 25, 27 thereof extending forwardly. Lower frame assembly 13 additionally includes a tubular support bar 29 having a flattened horizontal portion 31 which extends over bight 23 and is fixedly attached thereto by suitable means, as a rivet 33. Support bar 29 extends forwardly from portion 31 centrally of U-shaped member 21 and beyond the ends of legs 25, 27 where it terminates at its forward end in a flattened vertically extending portion 35. Support bar 29 is inclined slightly downward and forwardly, as best seen in FIG. 3 so that end portion 35 having an aperture 37 therein is adapted to be attached to the usual seat post mounting structure M of the bicycle B by utilizing the same bolt-nut assembly N that forms a part of mounting structure M and is utilized to clamp the post P of the bicycle in the usual manner.

Upper frame assembly 15 includes a pair of spaced apart forward upright members 39, 41 respectively fixedly attached adjacent the lower ends thereof as by rivets 39', 41' to the forward ends to legs 25, 27 and extend upwardly therefrom, a rearward upright member which has a forwardly extending right angular portion 43' at the lower end thereof which is fixedly attached to bight 23 as by the same rivet 33 that attaches support bar 29 to the bight, and a generally rectangular rim 45 which extends from forward upright member 39 around the back of rearward upright member 43 and to forward upright member 41. The rim 45 is fixedly attached as by welding or the like.

Suitable padding means as seat pad 51 and back pad 53 are preferably provided. Seat pad 51 is secured to the top side of lower frame assembly 13 by suitable means as the screws 55 extending through apertures in U-shaped member 21 and into the bottom of the pad. Back pad 53 is secured to upright member 43 by suitable means as the screws 57 extending through apertures in the upright member 43 and into the back of the pad 53. In addition, a safety strap 59 having buckle means 61 is preferably provided around upright member 43 for securing the infant in the seat.

Seat support assembly 19 includes an inverted U-shaped upright support brace 63 which includes a bight portion 65 and depending legs 67, 69. At lower ends of depending legs 67, 69 are respectively provided generally forwardly extending portions 71, 73 respectively having apertures 74 therethrough. The portions 71, 73 are preferably slightly angled downwardly and are adapted to be attached to the supporting structure S of the bicycle B so that the legs 67, 69 are offset rearwardly for the supporting structure. It will be understood that the supporting structure S is deemed to include the portion of the frame of the bicycle B which supports the axle per se, as well as the axle. In other words, it will be understood that the axle may extend through the apertures 74 with the usual nuts that normally retain the axle also retaining the U-shaped support brace, or suitable bolt-nut means as 75 may be utilized to attach the U-shaped support brace to the portion of the frame adjacent the axle of the wheel, as illustrated in FIG. 1, without departing from the spirit and scope of the present invention. A pair of bracket members 77, 79 respectively extend along the outer sides of legs 67, 69 along an upper portion thereof. Each of the bracket members are arcuate in cross-sectional shape, as shown by the bracket member 79 in FIG. 6, to closely fit the legs 67, 69. Each of the bracket members 77, 79 are preferably provided with a pair of apertures 82, 82 and each of the depending legs 67, 69 are provided with a plurality of pairs of transversely aligned apertures 83, 83. Each of the bracket members 77, 79 are preferably secured by a pair of bolts 84, 84 and nuts 85, 85 with the pair of bolts 84, 84 respectively extending through the pair of apertures 82, 82 and a selected pair of apertures 83, 83, and secured therein by nuts 85, 85. The upper ends of bracket members 77, 79 are preferably flattened and respectively pivotally secured by rivets 86, 86 to the depending turned down end portions 87, 87 of the transverse member 89. THe transverse member 89 is fixedly secured to the underside of legs 25, 27 and support bar 29 by rivets 91.

A pair of spaced-apart reach members 93, 95 are pivotally attached intermediate the upper and lower ends thereof to the forward ends of legs 25, 27 as by the same rivets 39', 41' which attach forward upright members 39, 41 to the legs 25, 27. For shipping or storage the reach members 93, 95 are preferably folded so that the normally depending lower ends thereof are folded underneath the lower frame assembly 13. However, in use, the reach members 93, 95 are as shown in FIG. 1 and are adapted to be locked in place by means hereinafter described. A retainer plate 97 having a V-shaped intermediate portion 98 and having rearwardly turned end portions 99, 101 is attached to reach members 93, 95 adjacent the upper ends thereof as by rivets 103. When in the in-use position, the lower portions of reach members 93, 95 are pivoted forwardly until retainer plate 97 abuts the forward edges of upright members 39, 41. A lock bar 105 is disposed behind upright members 39, 41 in line with retainer plate 97. Lock bar 105 is removably held in place by bolts 107 that pass through aligned apertures in lock bar 105 and retainer plate 97 and wingnuts 109 threadedly engaged on the ends of the bolts 107. It will be understood that the upright members 39, 41 which are between lock bar 105 and retainer plate 97 hold the reach members 93, 95 in place and prevent unwanted pivoting thereof when in use. Also, it will be understood that lock bar 105 may be easily removed for storage or shipment of the baby seat so that the reach members can be folded, as heretofore described. Adjacent the lower ends of reach members 93, 95 are respectively provided footrest spurs 111, 113, which are respectively attached by suitably means, as by bolt-nut assemblies 111', 113' removably fixed in selected apertures 115, 117 respectively provided in reach members 93, 95 to provide adjustment for the footrests 111, 113 at the desired height.

A pair of vertically arranged and horizontally spaced protector plates 119, 121 are provided on opposite sides of baby seat 11 adjacent the wheel W of the bicycle to prevent the baby's feet from contacting the spokes or wheel. Protector plate 121 is attached at the forward end thereof to reach member 95 and adjacent the rearward end to leg 69 by suitable means as cords 123. Similarly, protector plate 119 is attached to reach the member 93 and leg 67 by cords 123.

From the foregoing description, it is apparent that a very safe and sturdy baby seat is provided which overcomes many of the problems of previous baby seats. Thus, the U-shaped support brace 63 in combination with the arcuate bracket members 77, 79 prevent swaying of the baby seat and provide an adjustability which is removed from the crowded conditions adjacent the center of the rear wheel caused by speed-changing mechanism, etc. In addition, the forwardly turned end portions 71, 73 permit the brace 63 to be supported from the structure adjacent the center of the wheel without interference with the speed-changing mechanisms, etc.

Although the invention has been described and illustrated with respect to a preferred embodiment thereof, it is to be understood that it is not to be so limited since changes and modifications may be made therein which are within the full intended scope of this invention.

I claim:

1. A baby seat for support on the rear of a bicycle having a seat post mounting structure and support structure adjacent the rear wheel of the bicycle, said baby seat comprising horizontally extending lower frame means, upper frame means attached to said lower frame means and defining an upwardly oriented interior adapted to receive the baby, means disposed in said interior for supporting the baby, said lower frame means including a forwardly extending single narrow support bar adapted for fixed attachment at the forward end thereof to said seat post, a pair of bracket members, means attaching said bracket members adjacent the upper ends thereof to said lower frame means with said bracket members depending therefrom, an inverted U-shaped support brace including a pair of depending legs respectively being adjacent said bracket members and adapted for fixed attachment at the lower ends thereof to support structure adjacent the rear wheel of a bicycle for holding said legs fixed relative to said support structure, said bracket members being vertically positionable along said legs to a selected position wherein said lower frame means is at a selected height, means coacting between said bracket members and said legs for holding said bracket members fixed at a selected position relative to said legs.

2. The baby seat of claim 1 in which said legs respectively include forwardly extending portions at the lower ends thereof.

3. The baby seat of claim 1 in which said legs are tubular in shape and said bracket members are arcuate in cross section to closely fit said legs.

4. A baby seat for support on the rear of a bicycle having a seat post mounting structure and support structure adjacent the rear wheel of the bicycle, said baby seat comprising horizontally extending lower frame means, upper frame means attached to said lower frame means, upper frame means attached to said lower frame means and defining an upwardly oriented interior adapted to receive the baby, means disposed in said interior for supporting the baby, said lower frame means including a forwardly extending support bar adapted for attachment at the forward end thereof to said seat post, a pair of bracket members, means attaching said bracket members adjacent the upper ends thereof to said lower frame means with said bracket members depending therefrom, an inverted U-shaped support brace including a pair of depending legs respectively being adjacent said bracket members and adapted for attachment at the lower ends thereof to support structure adjacent the rear wheel of a bicycle, said bracket members being vertically positionable along said legs to a selected positioned wherein said lower frame means is at a selected height, means coacting between said bracket members and said legs for holding said bracket members fixed at a selected position relative to said legs; a pair of spaced-apart reach members pivotally attached to said lower frame members and depending therefrom, a pair of footrest spurs respectively attached to said pair of reach members, a retainer plate attached to said reach members adjacent the upper ends thereof and spanning the space therebetween, said retainer plate being disposed across the front of a portion of said upper frame means, a lock bar disposed behind said portion of said upper frame means, and means coacting between said retainer plate and said lock bar to clamp said portion of said upper frame means therebetween and removably hold said reach members fixed relative to said upper frame means.

5. The baby seat of claim 4 in which is included a pair of spaced protector plates respectively attached to one of said reach members and one of said legs.

6. A baby seat for support on the rear of a bicycle having support structure adjacent the rear wheel of the bicycle, said baby seat comprising horizontally extending lower frame means, said lower frame means including a forwardly extending single narrow support bar adapted for fixed attachment at the forward end thereof to said bicycle, upper frame means attached to said lower frame means and defining an upwardly oriented interior adapted to receive the baby, means disposed in said interior for supporting the baby, an inverted integrally formed U-shaped support brace including a pair of depending legs respectively having forwardly extending portions adapted for fixed attachment to support structure adjacent the rear wheel of a bicycle, and means fixedly attached to said lower frame means and adjustably attached to said pair of legs for adjusting the length of the extension of said legs from said lower frame to adjust the height of said baby seat relative to the bicycle upon which supported.

* * * * *